(12) United States Patent
Fornage

(10) Patent No.: US 9,917,447 B2
(45) Date of Patent: Mar. 13, 2018

(54) SYSTEMS AND METHODS FOR SYNCHRONIZING AN APPLIANCE LOAD TO A LOCAL POWER GENERATING CAPABILITY

(71) Applicant: Enphase Energy, Inc., Petaluma, CA (US)

(72) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 436 days.

(21) Appl. No.: 14/656,070

(22) Filed: Mar. 12, 2015

(65) Prior Publication Data

US 2015/0263525 A1    Sep. 17, 2015

Related U.S. Application Data

(60) Provisional application No. 61/952,352, filed on Mar. 13, 2014.

(51) Int. Cl.
| | |
|---|---|
| *H02J 3/14* | (2006.01) |
| *H02J 4/00* | (2006.01) |
| *H02J 3/28* | (2006.01) |
| *H02J 3/38* | (2006.01) |

(52) U.S. Cl.
CPC .............. *H02J 4/00* (2013.01); *H02J 3/14* (2013.01); *H02J 3/28* (2013.01); *H02J 3/382* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/438* (2015.04)

(58) Field of Classification Search
None
See application file for complete search history.

(56) References Cited

U.S. PATENT DOCUMENTS

| | | | |
|---|---|---|---|
| 8,373,303 | B1 | 2/2013 | Daniels et al. |
| 8,412,387 | B2 | 4/2013 | Park et al. |
| 8,774,974 | B2 | 7/2014 | Chee et al. |

(Continued)

FOREIGN PATENT DOCUMENTS

| | | |
|---|---|---|
| CN | 202856379 U | 4/2013 |
| CN | 202872386 U | 4/2013 |

(Continued)

OTHER PUBLICATIONS

International Search Report and Written Opinion dated Jun. 19, 2015 for PCT Application No. PCT/US2015/020382.

(Continued)

*Primary Examiner* — Cassandra Cox
(74) *Attorney, Agent, or Firm* — Moser Taboada

(57) ABSTRACT

An apparatus for synchronizing operation of one or more appliances to an amount of energy produced by a local power generator comprises a controller for reducing the power consumed by the one or more appliances in relation to an amount of power being generated by the local power generator. In one embodiment, the operation of the appliance(s) is controlled by the controller so that the system of appliance(s) and the local power generator does not consume any external energy (e.g., from a commercial power grid), despite variations in the amount of power delivered by the local power generator.

18 Claims, 3 Drawing Sheets

(56) References Cited

U.S. PATENT DOCUMENTS

| | | | |
|---|---|---|---|
| 9,395,741 B2* | 7/2016 | Shiga | H02J 3/14 |
| 2009/0319091 A1* | 12/2009 | Flohr | H02J 3/14 700/295 |
| 2010/0179708 A1 | 7/2010 | Watson et al. | |
| 2011/0202181 A1 | 8/2011 | Lee et al. | |
| 2012/0161523 A1 | 6/2012 | Kim et al. | |
| 2013/0106196 A1 | 5/2013 | Johnson et al. | |
| 2013/0127257 A1 | 5/2013 | Yamamoto et al. | |
| 2013/0151319 A1 | 6/2013 | Pan | |
| 2014/0214219 A1 | 7/2014 | Katayama et al. | |
| 2014/0277813 A1 | 9/2014 | Powell et al. | |
| 2014/0379161 A1 | 12/2014 | Busser | |

FOREIGN PATENT DOCUMENTS

| | | |
|---|---|---|
| EP | 2648142 A1 | 10/2013 |
| EP | 2686933 A2 | 1/2014 |
| EP | 2724384 A1 | 4/2014 |
| EP | 2645522 B1 | 11/2014 |
| JP | 2013183622 A | 9/2013 |
| JP | 5389061 B2 | 1/2014 |
| WO | WO-2012162646 A1 | 11/2012 |
| WO | WO-2013163350 A1 | 10/2013 |
| WO | WO-2014152429 A1 | 9/2014 |
| WO | WO-2015013658 A2 | 1/2015 |

OTHER PUBLICATIONS

Neal, "The Use of Ami Meters and Solar PV Inverters in an Advanced Volt/VAr Control System on a Distribution Circuit", Transmission and Distribution Conference and Exposition, 2010 IEEE PES, pp. 1-4, Apr. 2010.

Turitsyn et al., "Options for Control of Reactive Power by Distributed Photovoltaic Generators", Proceedings of the IEEE, vol. 99, Issue 6, pp. 1063-1073, Jun. 2011.

Liu et al., "Coordinated Control of Distributed Energy Storage System with Tap Changer Transformers for Voltage Rise Mitigation Under High Photovoltaic Penetration", IEEE Transactions on Smart Grid, vol. 3, Issue 2, pp. 897-906, Feb. 3, 2012.

Sechilariu et al., "Building Integrated Photovoltaic System with Energy Storage and Smart Grid Communication", IEEE Transactions on Industrial Electronics, vol. 60, Issue 4, pp. 1607-1618, Oct. 4, 2012.

Batista et al., "Photovoltaic and Wind Energy Systems Monitoring and Building/Home Energy Management using ZigBee Devices within a Smart Grid", Energy, vol. 49, pp. 306-315, Jan. 1, 2013.

Bletterie et al., "Optimisation of LV Networks with High Photovoltaic Penetration—Balancing the Grid with Smart Meters", PowerTech (POWERTECH), 2013 IEEE Grenoble, 6 pages.

\* cited by examiner

SYSTEMS AND METHODS FOR SYNCHRONIZING AN APPLIANCE LOAD TO A LOCAL POWER GENERATING CAPABILITY

REFERENCE TO RELATED APPLICATIONS

The present application claims the benefit of priority to U.S. Provisional Patent Application Ser. No. 61/952,352 filed on Mar. 13, 2014 and entitled "ZERO ENERGY APPLIANCE", which is herein incorporated in its entirety by reference.

BACKGROUND OF THE INVENTION

Field of the Invention

Embodiments of the present disclosure relate generally to controlling operation of one or more appliances based on power generation by one or more power converters.

Description of the Related Art

Current worldwide growth in demand for energy is leading to a durable increase in energy usage and a rapid depletion of existing fossil fuels to supply the required energy. Many of today's energy users are in search of ways to utilize energy more efficiently and reduce their energy consumption from fossil fuels. One approach is to incorporate a grid-tied local energy generation strategy wherein a locally developed renewable energy resource such as solar, wind, or hydro-electric power, is tied to a load center (residential building) or panel board (commercial building) and/or to a commercial grid so that the surplus or all locally generated electricity can be sold back to a utility.

To the extent the power generating capacity fails, at times, to meet an owner's projections or expectations, usage of certain high-demand appliances such, for example, as heating, ventilation, and air conditioning (HVAC) equipment, the owner may experience unsettling spikes in utility bills. For example, a heat pump operated to generate heat during times of low insolation might outpace the delivery capabilities of a solar energy system.

Therefore, there is a need in the art for a method and apparatus for efficiently controlling the operation and/or power consumption of one or more appliances based on power generated by renewable energy systems.

SUMMARY OF THE INVENTION

Embodiments of the present invention generally relate to systems and methods for controlling operation of one or more appliances based on power generation by one or more power converters as shown in and/or described in connection with at least one of the figures, as set forth more completely in the claims.

A method and apparatus for operating at least one power consuming appliance synchronizes the amount of energy consumed by the at least one appliance to an amount of energy produced by a local power generator (e.g., a solar power generator).

In some embodiments consistent with the claimed invention, an apparatus for synchronizing operation of one or more appliances to an amount of energy produced by a local power generator comprises a controller for reducing the power consumed by the one or more appliances in relation to an amount of power being generated by the local power generator. In one embodiment, the operation of the appliance(s) is controlled by the controller so that the system of appliance(s) and the local power generator does not consume any external energy (e.g., from a commercial power grid), despite variations in the amount of power delivered by the local power generator.

In some embodiments, a method for operating at least one power consuming appliance includes reducing the power consumed by the one or more appliances in relation to an amount of power being generated by the local power generator. These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments consistent with the present disclosure generally relate to systems and methods for controlling operation of one or more appliances based on power generation by one or more power converters. In embodiments, one or more appliances are operated so that the amount of energy they consume does not exceed the power produced by a local power generator (e.g., a solar power generator). In some embodiments, this is achieved by reducing the amount of power consumed by the appliance(s) when the power being generated by the local power generator falls to or below a threshold. The threshold may be a power consumption threshold corresponding to the simultaneous operation of some or all of the electrically operated appliances associated with a given installation, and may be derived on an instantaneous or an average power basis. When the local generator resumes generating power at a level which exceeds the threshold, the one or more appliances subject to reduced power operation are returned to a normal mode of operation (e.g., at a level of power consumption consistent with unrestricted operation of the appliance).

Figure 1:
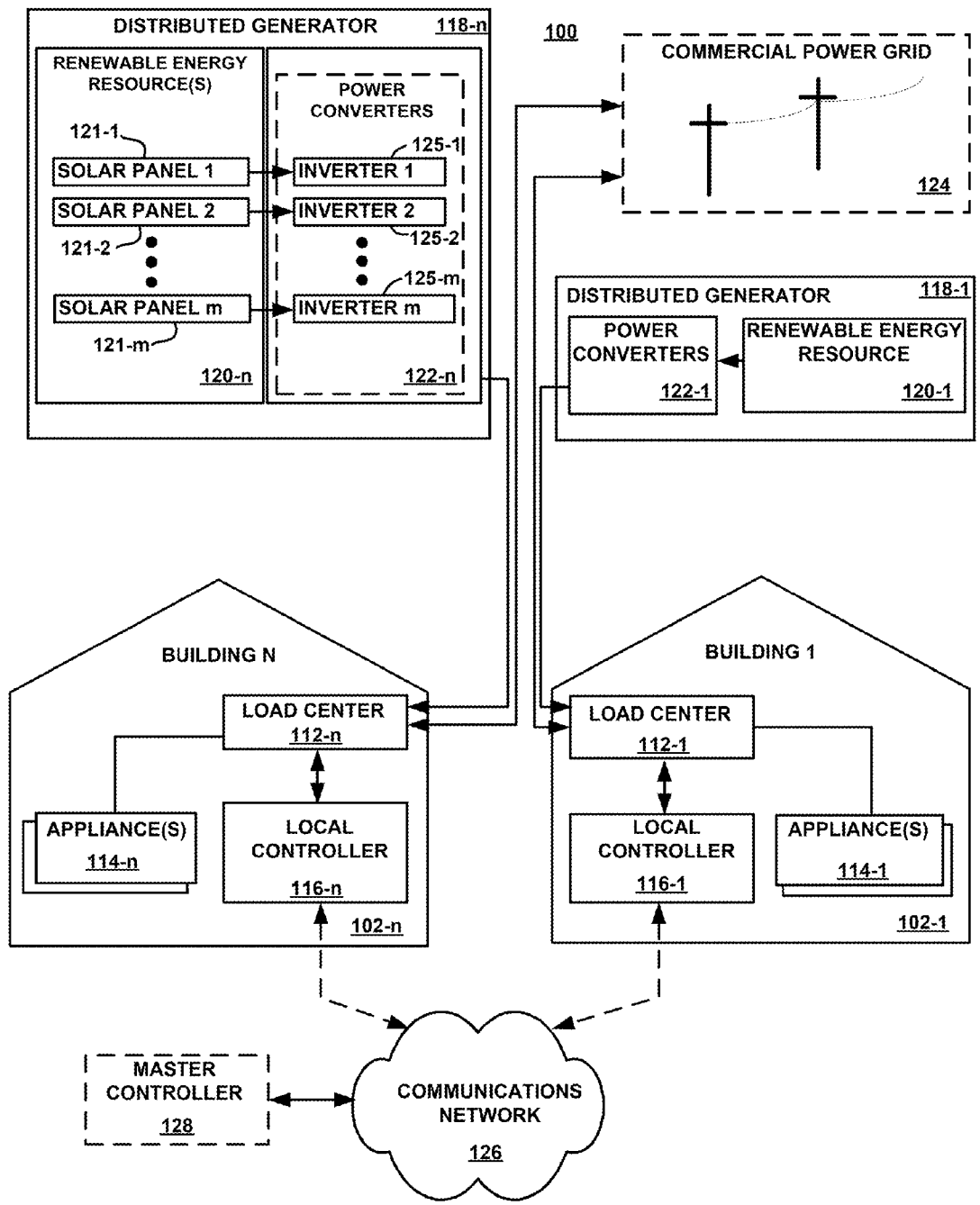
FIG. 1 is a block diagram of a system in accordance with one or more embodiments of the present invention.

FIG. 1 is a block diagram of a system 100 including an appliance load synchronizing controller in accordance with one or more embodiments of the present disclosure. This diagram only portrays one variation of the myriad of possible system configurations. The present invention can function in a variety of environments and systems.

The system 100 comprises one or more buildings which may comprise, such as one or more commercial buildings and/or one or more residential buildings. Two such buildings, indicated generally at 102-1 and 102-n, are depicted in FIG. 1 for purposes of illustrative example. Each of buildings 102-1 and 102-n is coupled to a distributed generator (DG), as generators 118-1 and 118-n, respectively, and to a commercial power grid 124 via a load center, as load centers 112-1 and 112-n, respectively. The system 100 additionally comprises one or more appliances in each building, as appliances 114-1 and 114-n, respectively.

The DG system 118-1 associated with building 1 comprises a renewable energy source (RES) 120 coupled to one or more power converters 122-1. The RES 120-1 may be any type of system for generating DC power from a renewable form of energy, such as wind, solar, hydro, and the like, and may optionally include a battery or bank of batteries. The power converters 122-1 may comprise DC/DC power converters or DC/AC power converters, and in some embodiments the power converters 122-1 may be directly coupled to the appliances 114-1 and the DC controller 116-1 rather than via the load center 112-1. In some embodiments consistent with the present disclosure, power generated from the power converters 122-1 is coupled to the commercial power grid 124 and/or stored for later use (e.g., utilizing batteries, heated water, hydro pumping, $H_2O$-to-hydrogen conversion, or the like).

In a particular embodiment, the RES 120 comprises a plurality of photovoltaic (PV) modules (not shown) and the power converters 122-1 are DC/AC inverters where each PV module is coupled to an inverter in a one-to-one correspondence. In those embodiments where the power converters 122-1 are DC/AC inverters, the inverters convert DC power from the RES 120 to AC power that is commercial power grid compliant and couple the AC power to the one or more appliances 114-1.

Associated with Building No. N is a particular embodiment of distributed generator DG 118-n in which RES 120-n comprises a set of m photovoltaic (PV) modules 121-1 to 121-m and the power converters 122-n include a matching number of DC/AC inverters 125-1 to 125-m. Typically, a distributed generator installation includes a sufficient number m of power converters to supply the average power consumption needs of the building or buildings with which it is associated, though the actual number may be more or less depending upon the perceived need for redundancy in the event of component failure(s) and/or the need to make up for sustained variations in insolation levels.

The plurality of inverters 125-1 to 125-m comprising converters 122-n converts energy supplied by RES 120-n into a form useable to power electrically operated devices (collectively referred to herein as "appliances") within building N. In accordance with an embodiment, at least some of the appliances are operated according to a normal mode of power consumption, when the power generating capacity supplied by power converters 122-1 to 122-m meets or exceeds a threshold. The threshold is typically a power consumption threshold, as for example an instantaneous power consumption threshold representing an average power consumption value approximating the average power consumption by all appliances of building N in the aggregate, an instantaneous power consumption value approximating the instantaneous power consumption by all appliances of building N in the aggregate, or either of these for a subset of the appliances.

The controller 116-n is coupled to the load center 112-n for providing operational control of the power converters 122-n and/or receiving information from the power converters 122-n (e.g., status information, data related to power conversion, and the like); the controller 116-n may further control and/or receive information from the appliances 114-n. In some embodiments, the controller 116-n provides such control utilizing power line communication (PLC) to communicate with the power converters 122-n and/or appliances 114-n; additionally or alternatively, the controller 116-1 may utilize other types of wired and/or wireless techniques for such communication. In some embodiments, the controller 116-n is communicatively coupled to a master controller 128 via a communications network 126 (e.g., the Internet) for sending information to/receiving information from the master control 128 (e.g., information related to the power converters 122-n and/or appliances 114-n). The controller 116-n may utilize wired and/or wireless techniques for coupling to the communications network 126; in some embodiments, the controller 116-n may be coupled to the communications network 126 via a commercially available router.

In accordance with one or more embodiments of the present invention, the controller 116-n matches the power consumption required by the appliances 114-n to the power generated by the power converters 122-n such that the appliances 114-n consume the amount of power generated by the power converters 122-n. For example, the controller 116-n controls operation of the appliances 114-n to match power production from the power converters 122-n and average consumption of the appliances 114-n (e.g., the controller 116-n may control a thermostat setting for a heating system). As such, the appliances 114-n may be operated so that they do not consume any net commercially-generated power and the user (e.g., a homeowner) incurs no charges from the utility company for operating the appliances 114-n. The appliances 114-n may be any one or more of a variety of appliances, such as a heating, ventilation, and air conditioning (HVAC) system, a ceiling fan or group of ceiling fans, an irrigation water pump, and the like.

In some embodiments, one or more of the appliances 114-n, the controller 116-n and/or the master controller 128 may provide a user-settable override that allows the appliances 114-n to continue operating when more power is required than is generated by the DG 118-n or to operate without any power from the DG 118-n. Additionally or alternatively, such an override may be done at the appliances 114-n themselves. During such operation, additional power needs for the appliances 114-n may be provided by the commercial grid 124 and/or power storage devices. Additionally or alternatively, when operation of the appliances 114-n requires more power than is available from the DG 118-n, the appliances 114-n may be operated in a reduced-power mode such that they consume less power.

Certain embodiments may comprise a plurality of appliances 114, such as multiple HVAC systems. In one or more of such embodiments, each of the appliances 114-n may have a different priority and be operated according to their priority.

In one or more embodiments, the controller 116-n controls the appliances 114-n by modulating the operation of one or more motors of the appliances 114-n. For example, the controller 116-n may modulate the operation of a motor controller for a compressor of an HVAC system depending upon the DG power available.

Figure 2:
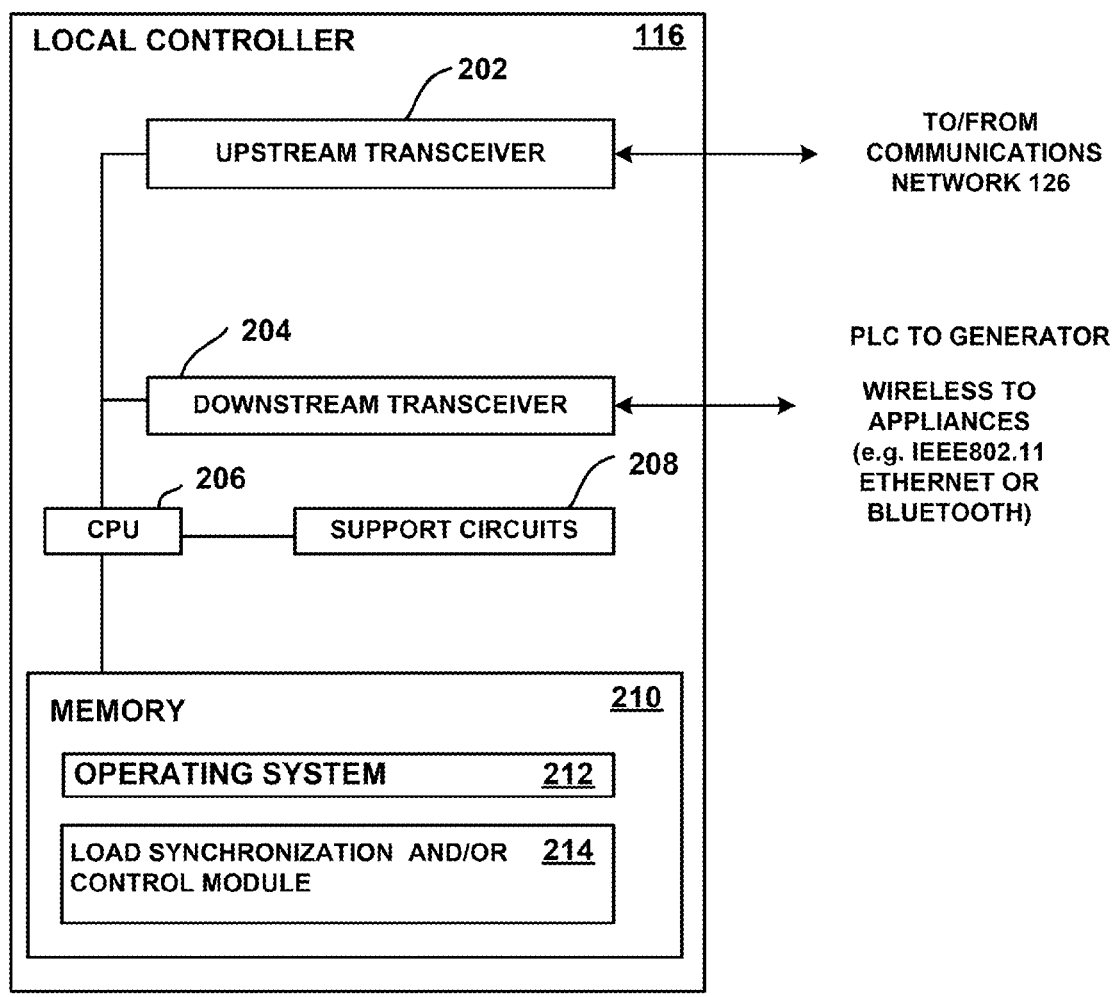
FIG. 2 is a block diagram of a controller in accordance with one or more embodiments of the present invention.

FIG. 2 is a block diagram of a controller 116 in accordance with one or more embodiments of the present invention. The controller 116 comprises an upstream transceiver 202 communicatively coupled to the communications network 126, and a downstream transceiver 204 communicatively coupled to the power converters 122 and/or the appliances 114. The transceivers 202 and 204 may utilize wireless (e.g., based on standards such as IEEE 802.11, Zigbee, Z-wave, or the like) and/or wired (e.g., PLC) communication techniques for such communication.

The controller 116 further comprises at least one central processing unit (CPU) 206 coupled to each of the transceivers 202 and 204, support circuits 208 and a memory 210. The CPU 206 may comprise one or more conventionally available microprocessors; alternatively, the CPU 206 may include one or more application specific integrated circuits (ASIC). In some embodiments, the CPU 206 may be a microcontroller comprising internal memory for storing controller firmware that, when executed, provides the controller functionality herein. The controller 116 may be implemented using a general purpose computer that, when executing particular software, becomes a specific purpose computer for performing various embodiments of the present invention.

The support circuits 208 are well known circuits used to promote functionality of the CPU 206. Such circuits include, but are not limited to, a cache, power supplies, clock circuits, buses, network cards, input/output (I/O) circuits, and the like.

The memory 210 may comprise random access memory, read only memory, removable disk memory, flash memory, and various combinations of these types of memory. The memory 210 is sometimes referred to as main memory and may, in part, be used as cache memory or buffer memory. The memory 210 generally stores an operating system (OS) 212 of the controller 116. The OS 212 may be one of a number of available operating systems for microcontrollers and/or microprocessors.

The memory 210 may store various forms of application software, such as an appliance power consumption (or "load") synchronization and/or control module 214 for matching the appliance load to the power from the power converters 122 and operatively controlling the appliances 114 and/or the power converters 122 as previously described with respect to FIG. 1. The memory 210 may also store a database (not shown) for storing data related to the operation of the power converters 122 and/or the appliances 114.

In an embodiment, the power consumption synchronization module 214 is configured to operate at different power consumption levels under different or even the same operating conditions. By way of example, an HVAC system such as a heat pump generally includes one or more fan motors and also one or more compressor or pump motors for pressurizing and moving a working fluid to and from an outdoor condensing unit. These motors and fans are cycled on and/off in response to calls for cooling (or heat) by a thermostat. During periods of relatively low insolation (e.g., a cloudy but hot summer day), for example, the thermostat (not shown) may trigger a call for cooling at a given installation which, if acted upon, might cause the aggregate, instantaneous demand by all appliances at the installation to exceed the rate at which power is being generated by the distributed generator (such as DG 118 of FIG. 1).

According to one or more embodiments, local controller 116 determines—from measurements obtained by the power converters of the distributed generator—that the power being generated by the distributed generator is below a threshold such as the average power being actively consumed by all appliances associated with the installation, the instantaneous power being actively consumed by all appliances associated with the installation, or a time of day and/or year estimate of either of these values. At such times, controller 116 generates and transmits a first control signal which is received by a control module that, in response to receipt of the first control signal, prevents the actuation of the pump and/or fan motors of the HVAC system for an interval selected to achieve a reduction in power consumption sufficient to bring the aggregate demand of the appliances into balance with the rate at which it is being supplied.

Controller 116 is further configured to generate and transmit a second signal for returning the appliance(s), such as the motors of the aforementioned HVAC system, to a normal mode of operation wherein they are permitted to cycle on and off according to their normally configured set points.

The master controller 128 is a type of controller, analogous to the controller 116, which may comprise fewer elements than/additional elements to the controller 116. For example, the master controller 128 may comprise application software for managing the DG 118-1 and 118-*n* (FIG. 1) as well as other DGs.

Figure 3:
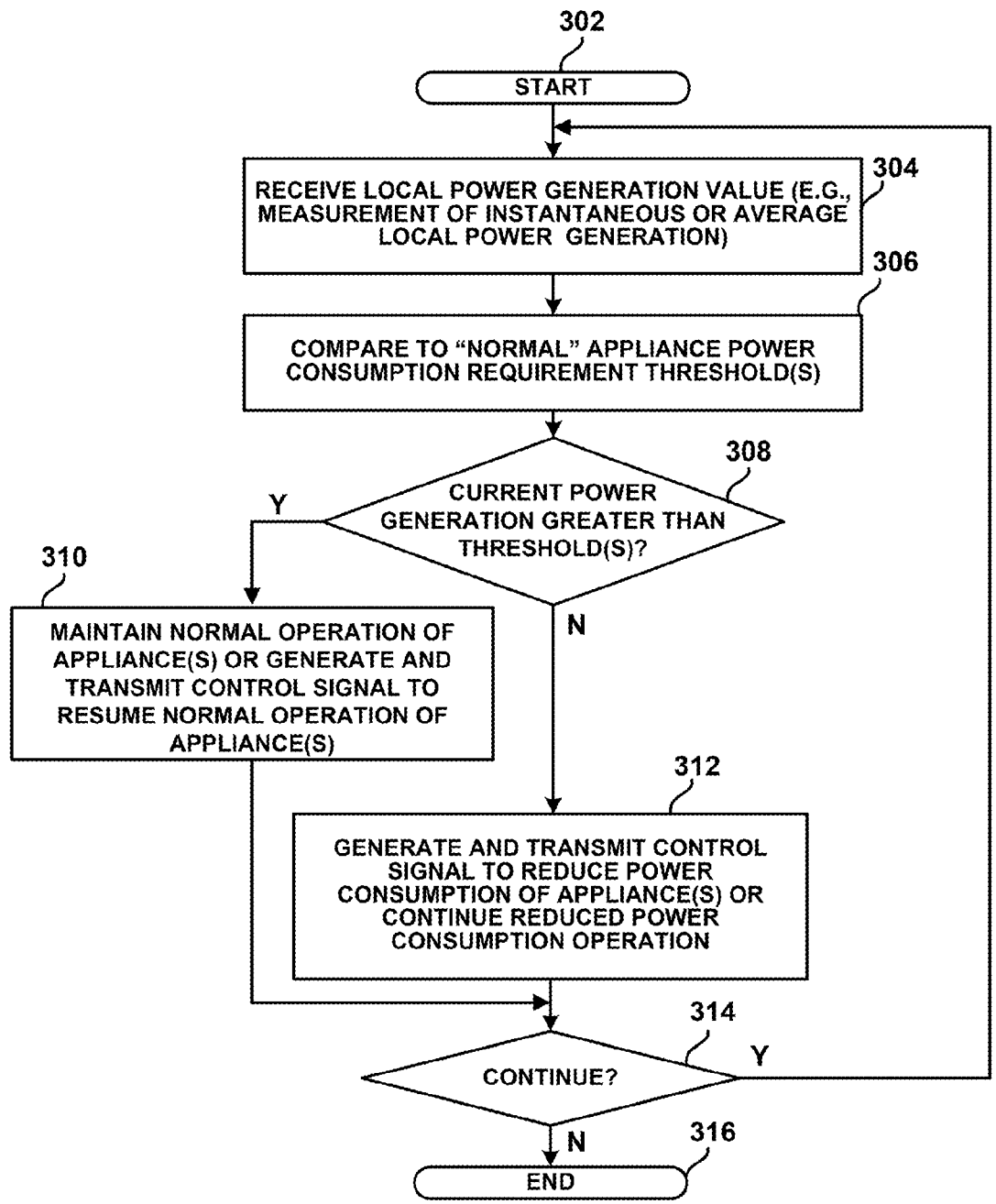
FIG. 3 is a flow diagram of a method 300 for controlling the operation of an appliance in accordance with one or more embodiments of the present invention.

FIG. 3 is a flow diagram of a method 300 for operating an appliance in accordance with one or more embodiments of the present invention. The method 300 is an implementation of the appliance control module 214.

The method 300 starts at 302 and proceeds to 304. At 304, the method 300 receives one or more measurements of instantaneous or average power generated by and/or available from one or more local power generator(s). At 306, the method determines the amount of power being (or that can be) generated by the one or more local power generators. At 308, the method determines whether the local power generators can generate sufficient power to operate the one or more appliances in an unrestricted or "normal" manner (i.e., with all components thereof being free to draw the amount of power called for by their respective design and normal operating parameters).

If at 308, the method 300 determines that the threshold is met or exceeded, the method 300 proceeds to 310 where the method operates the appliances according to the normal manner described above. In some embodiments, normal operation of an appliance may be facilitated (i.e., "enabled") by the receipt of a control signal generated and transmitted from a controller. In other embodiments, normal operation of an appliance may proceed by default, wherein the receipt of a control signal might be needed solely to return the appliance to the normal "mode" of operation from, for example, a condition where the appliance is being operated to consume a reduced level of power compared to the normal mode. In some embodiments, if the power converters are capable of generating more power than needed by the appliances, the residual power may be coupled to the commercial power grid and/or stored for later use.

If, at 308, it is determined that the power converters cannot generate sufficient power to operate the appliances, the method 300 proceeds to 312. At 312, method 300 operates one or more of the appliances at a lower level of power consumption. In an embodiment, transition from a normal mode of operation to a lower level of power consumption is triggered when a power reduction control signal, generated and transmitted by a controller, is received by the one or more appliances. If the appliance(s) are already being operated at a reduced level of power consumption, then such operation is continued by method 300 at 312.

In some embodiments, method 300 makes a preliminary determination as to whether a user override has been received to power the appliances despite the local power generating capability falling below the instantaneous and/or average threshold. In some such embodiments, if the result of such a preliminary determination is yes, the method 300 may alternatively advance to proceeds to step 310 where the appliances are operated normally using available power from the power converters, and any additional power required to operate the appliance(s) obtained from the commercial grid and/or power storage systems. In other such embodiments, the appliance(s) may be operated without any power provided by the power converters.

The method 300 proceeds from each of steps 310 and 312 to step 314, where method 300 determines whether controlled operation of the appliance(s) is to continue. If the result of such determination is yes, the method 300 returns to step 304. If the result of such determination is no, the method 300 proceeds to step 316 where it ends. Alternatively, if no override is determined at step 312, the method 300 proceeds to step 318 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for synchronizing operation of one or more appliances to an amount of energy produced by a local power generator, comprising:
a controller for reducing power consumed by the one or more appliances in relation to an amount of power being generated by the local power generator, wherein the controller is configured to determine a power generation capability by one or more power converters of the local power generator and to operate at least one of the one or more appliances based on at least one of the determined power generation capability and power consumption requirements for the one or more appliances.

2. The apparatus of claim 1, wherein the controller is configured to determine the power generation capability by receiving measurements of at least one of instantaneous or average power generated by the one or more power converters.

3. The apparatus of claim 1, wherein the controller is configured to generate a control signal for at least one of stopping, starting, or modifying operation of the at least one of the one or more appliances.

4. The apparatus of claim 1, wherein the controller is configured to generate a control signal for operating the at least one of the one or more appliances at a reduced level of power consumption, equal to or less than power being generated by the local power generator, while power generation capability of the local power generator is determined to be below a threshold.

5. The apparatus of claim 4, wherein the controller is configured to generate a control signal for returning the at least one of the one or more appliances to a normal level of power consumption when at least one of instantaneous power generation and average power generation by the local power generator meets or exceeds the threshold.

6. The apparatus of claim 4, wherein the threshold is an average power consumption threshold.

7. The apparatus of claim 4, wherein the threshold is an instantaneous power consumption threshold.

8. The apparatus of claim 3, wherein the controller is configured to generate a control signal for operating the at least one of the one or more appliances in a normal power consuming mode while at least one of instantaneous power generation and average power generation by the local power generator meets or exceeds a threshold.

9. The apparatus of claim 8, wherein the threshold is one of an average power consumption threshold and an instantaneous power consumption threshold.

10. A method for synchronizing operation of one or more appliances to an amount of energy produced by a local power generator, comprising:
reducing power consumed by the one or more appliances in relation to an amount of power being generated by the local power generator, wherein reducing the power comprises:
determining power consumption requirements for the one or more appliances;
determining power generation capability for one or more power converters of the local power generator; and
operating the one or more appliances based on at least one of the power consumption requirements and the power generation capability.

11. The method of claim 10, wherein determining power generation capability comprises receiving measurements of at least one of instantaneous or average power generated by the one or more power converters.

12. The method of claim 10, wherein the operating comprises generating control signals for at least one of stopping, starting, or modifying operation of at least one of the one or more appliances.

13. The method of claim 12, wherein the generated control signals include a first control signal for operating the at least one of the one or more appliances at a reduced level of power consumption, equal to or less than power being generated by the local power generator, while power generation capability of the local power generator is determined to be below a threshold.

14. The method of claim 13, wherein the generated control signals include a second control signal for returning the at least one of the one or more appliances to a normal level of power consumption when at least one of instantaneous power generation and average power generation by the local power generator meets or exceeds the threshold.

15. The method of claim 13, wherein the threshold is an average power consumption threshold.

16. The method of claim 13, wherein the threshold is an instantaneous power consumption threshold.

17. The method of claim 12, wherein the generated control signals cause the at least one of the one or more appliances to operate at a reduced level of power consumption while at least one of instantaneous power generation and average power generation by the local power generator are at least one of at or below a threshold.

18. The method of claim 17, wherein the threshold is one of an average power consumption threshold and an instantaneous power consumption threshold.

* * * * *